United States Patent Office 2,720,538
Patented Oct. 11, 1955

2,720,538

BRIGHTENING AGENTS COMPRISING 4,4'-BIS(TRI-FLUOROMETHYLPHENYL CARBAMIDO) - 2,2'-STILBENE SULFONIC ACID

John Charles Moessinger, New York, N. Y., assignor to General Aniline & Film Corporation, New York, N. Y., a corporation of Delaware No Drawing. Application December 3, 1951, Serial No. 259,709

4 Claims. (Cl. 260—506)

This invention relates to novel fluorescent agents which have been found to be of value as brightening agents, particularly for the brightening of textiles by incorporation of a minor amount thereof in soaps or other detergents used to wash textiles.

The novel compounds of the present invention are the products obtained by condensing 4,4'-diamino-2,2'-stilbene disulfonic acid with trifluoromethyl-phenyl isocyanate or simply substituted trifluoromethylphenylisocyanate.

These novel compounds may be represented by the following general formula:

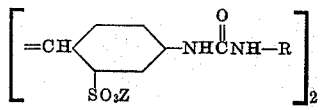

wherein Z is hydrogen or a cation, usually alkali metal and more usually sodium, R is trifluoromethylphenyl or simply substituted trifluoromethylphenyl such as 2-methoxy - 5 - trifluoromethylphenyl, 2 - (p - chlorophenoxy) - 5 - trifluoromethylphenyl, 2 - (o - tolyloxy) - 5 - trifluoromethylphenyl, o-, m- and p-trifluoromethylphenyl, 3,5-bistrifluoromethyl)phenyl, 4 - fluoro - 2 - trifluoromethylphenyl, 2 - cyano - 5 - trifluoromethylphenyl, 2 - chloro - 5 - trifluoromethylphenyl, 2,5 - dichloro - 4 - trifluoromethylphenyl and the like.

These novel compounds are readily prepared, for example, by the condensation of one molecular proportion of 4,4'-diamino-2,2'-stilbenedisulfonic acid with five molecular proportions of a trifluoromethyl- or substituted trifluoromethylphenyl isocyanate. These trifluoromethyl- or substituted trifluoromethylphenyl isocyanates are prepared by treatment of trifluoromethyl anilines or simply substituted trifluoromethyl anilines with phosgene. As examples of simply substituted trifluoro anilines which may be reacted with phosgene to produce trifluoromethyl isocyanates which are of value for condensing with 4,4'-diaminostilbene-2,2' disulfonic acid for producing the novel fluorescent agents of this invention may be mentioned: 1 - amino - 2 - methoxy - 5 - trifluoromethyl-benzene, 1 - amino - 2 - (p - chloro - phenoxy) - 5 - trifluoromethylbenzene, 1 - amino - 2 - (o - tolyloxy) - 5 - trifluoromethylbenzene, o-, m- and p - aminotrifluoromethylbenzene, 3,4 - bis(trifluoromethyl)aniline, 1 - amino - 4 - fluoro - 2 - trifluoromethylbenzene, 1 - amino - 2 - cyano - 5 - trifluoromethylbenzene, 1 - amino - 2 - chloro - 5 - trifluoromethylbenzene, 1 - amino - 2,5 - dichloro - 4 - trifluoromethylbenzene, 1 - amino - 2 - chloro - 5 - trifluoromethylbenzene, 1 - amino - 2,5 - dichloro - 4 - trifluoromethylbenzene and the trifluoromethylanilines disclosed in U. S. Patents Nos. 2,093,115, 2,194,925 and 2,056,899 and French Patent No. 805,704.

The thus obtained novel fluorescent agents are useful when incorporated into paper pulp to improve the whiteness of the finished sheet. When applied to fabrics, particularly of wool, silk or protein fibers in general, by methods well known in the art, the whiteness of these fabrics is remarkably improved. If small quantities of these materials are added to soaps or other detergents, fabrics, which are washed using these formulations, will be much whiter in the case of whites and much brighter in the case of colors than fabrics which are washed using ordinary soaps or detergents.

The preparation of the novel compounds of the present invention and their specific properties may be apparent from a consideration of the following specific example in which the parts are by weight:

*Example*

A mixture of 9.3 parts of 4,4'-diamino-2,2'-stilbenedisulfonic acid, 100 parts of water and sufficient sodium carbonate (as 20% aqueous solution) to effect solution of the organic component is heated to 40° C. Twenty-three and four-tenths parts of 3-trifluoromethylphenylisocyanate is added slowly and the mixture heated to 85° C. for several hours. The mixture is cooled and the product isolated in the usual manner. It corresponds to the formula:

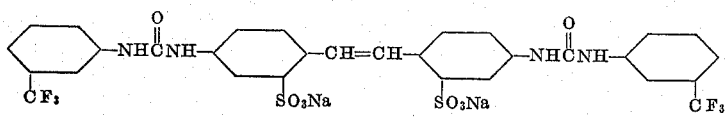

When this material is introduced into paper pulp the whiteness of the finished sheet is significantly improved. When applied to fibers of wool, silk or protein fibers in general, by methods well known in the art, the white appearance of the fabric is thereby much improved.

If small amounts of this substance are added to soaps or other detergents and the resulting mixture is used to wash fabrics of cellulose, wool, silk or nylon, the white materials thus washed are extraordinarily whiter in appearance and colored materials are brighter than the same fabrics washed using ordinary soaps or detergents.

In addition to the product prepared above, a number of other related compounds have been prepared by condensing 4,4'-diamino-2,2'-stilbenedisulfonic acid in the manner described above with a number of the simply substituted trifluoromethylphenyl isocyanates obtained by reacting with phosgene a number of the simply substituted trifluoromethyl anilines mentioned previously. Such compounds have been found to be substantially similar in properties to the product obtained in the foregoing example and it is therefore believed that the products obtained by condensing 4,4'-diamino-2,2'-stilbenedisulfonic acid with simply substituted trifluoromethyl phenyl isocyanates as a class are valuable fluorescent agents.

By the term "simply substituted" it is meant to include only those trifluoromethylphenyl isocyanates in which one or more hydrogens of the phenyl group are replaced by amino, lower alkoxy (1 to 4 carbon atoms) aryloxy (phenoxy and simply substituted phenoxy, e. g., chloro and methoxy substituted phenoxy) cyano, or halo (fluoro, bromo, chloro) of the type previously mentioned.

It will be apparent that the novel fluorescent agents of the present invention are, when produced as described in the foregoing example, obtained in the form of their sodium salts and they are generally used in this form for incorporation into soaps and other detergents which are slightly alkaline. A particular advantage of the fluorescent agents of the present invention is that they are valuable for the whitening or brightening of proteinaceous fibers in general such as wool and silk from non-acid baths. The free acids of the novel fluorescent agents of the present invention are substantially water insoluble and may be obtained, if desired, by acidification of the sodium salt with strong mineral acids. The thus obtained free acids may be used for the production of other salts such as potassium ammonium alkylamine salts, etc. which are obtainable by neutralization of the free acids. Where spirit solubility is desired (for use in paints, lacquers, plastics, etc.) various amine salts such a dicyclohexylamine or ditolylguanidine obtained by reacting the free acids with dicyclohexylamine or ditolylguanidine, may be used.

It will be understood, of course, that the novel fluorescent compounds of this invention need not be used in combination with soaps or other detergents but may be applied to fabrics from a separate treating bath or mainly incorporated in materials such as paper, regenerated cellulose, cellulose acetate, etc., during the course of manufacture.

I claim:

1. Fluorescent agents selected from the group consisting of compounds of the formula—

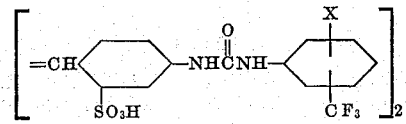

wherein X represents a member of the group consisting of hydrogen, methoxy, phenoxy, chlorophenoxy, tolyloxy, trifluoromethyl, halo, cyano and nitro substituents and the salts of such compounds.

2. Fluorescent agents of the formula

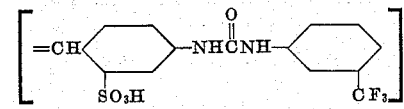

3. The salts of the fluorescent agent of the formula

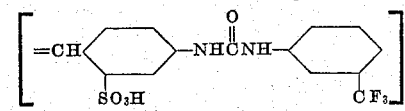

4. Fluorescent agent of the formula—

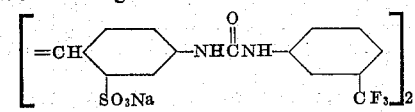

No references cited.